Feb. 20, 1962 W. C. JOHNSON 3,022,413
PROCESS AND APPARATUS FOR ARC WELDING
Filed Feb. 8, 1960
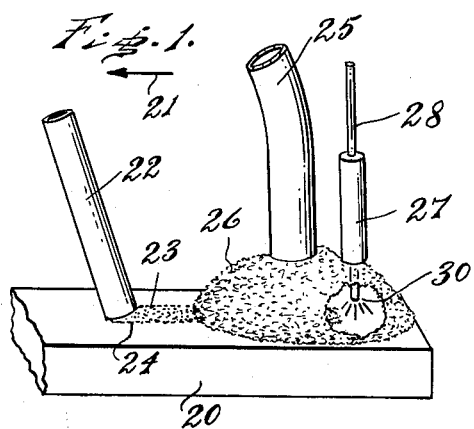
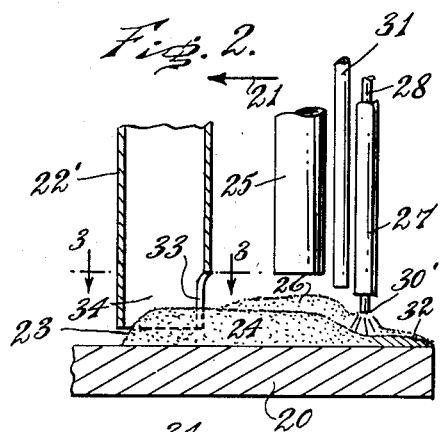
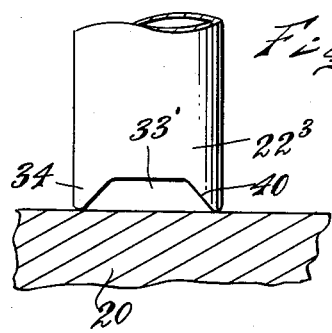
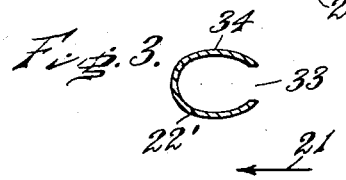
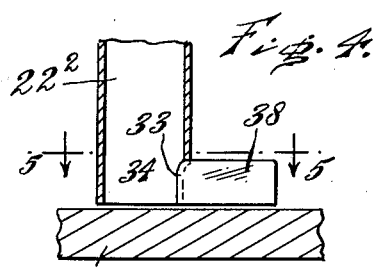
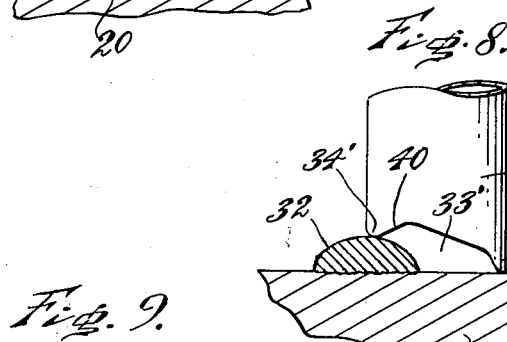
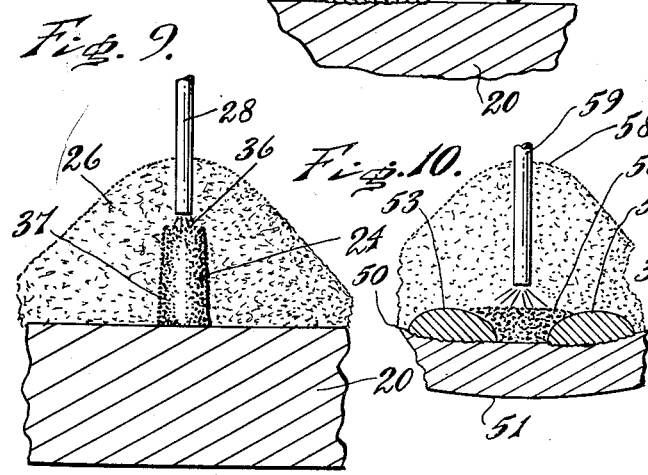
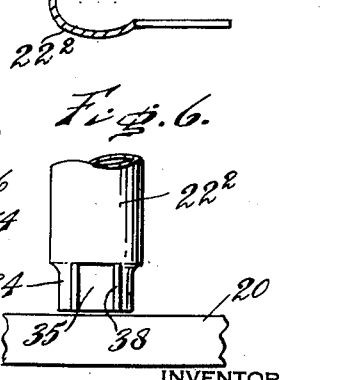
INVENTOR
Wallace C. Johnson
BY
ATTORNEYS

United States Patent Office 3,022,413
Patented Feb. 20, 1962

3,022,413
PROCESS AND APPARATUS FOR ARC WELDING
Wallace C. Johnson, Hamden, Conn., assignor to Arcos Corporation, Philadelphia, Pa., a corporation of Pennsylvania
Filed Feb. 8, 1960, Ser. No. 7,197
10 Claims. (Cl. 219—73)

The present invention relates to electric arc welding, particularly to overlay welding and cladding.

A purpose of the invention is to more effectively restrict the penetration of the new weld bead into the base metal or the previous weld bead.

A further purpose is to lay down a layer of loose metallic particles and to form an electric arc to that layer, fusing it entirely with the adjoining surface of the base metal and thus reducing the penetration into the base metal or the previous weld metal.

A further purpose is to make the layer of metallic particles of a thickness of at least one-quarter inch and preferably at least one-half inch so as to more effectively restrict penetration into the base metal or the previous weld metal.

A further purpose is to maintain the cross section of the layer of metallic particles relatively thick and relatively narrow, with a steepness greater than the angle of repose, by initially guiding the metallic particles at the sides of the feed nozzle and suitably by trailing guides from the nozzle, and also desirably by blanketing the layer of metallic particles with flux particles which will tend to hold the layer of metallic particles in a cross section steeper than the angle of repose of the metallic particles.

A further purpose is to introduce alloy in high alloy compositions by ingredients which need not be previously compounded, but can simply be blended from powders or the like.

A further purpose is to eliminate the need for binder in the metallic layer and thus obtain higher bulk density and better electrical conductivity, particularly from the standpoint of starting the arc.

A further purpose is to obtain a more simple and convenient control over the feed of the metallic particles which limits penetration and supplies alloy, conveniently by simply using a nozzle, whose position is adjustable, the flow through which can be regulated by a valve.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

FIGURE 1 is a diagrammatic perspective of the invention applied to submerged arc welding. This view shows the lower part of a welding machine, omitting the carriage, wheels and the like.

FIGURE 2 is a central vertical section showing the invention applied to gas protected exposed arc welding. This is the lower part of a welding machine as in FIGURE 1.

FIGURE 3 is a section on the line 3—3 of FIGURE 2.

FIGURE 4 is a view of the metal particle feed tube of FIGURE 3 in a vertical section illustrating a variation.

FIGURE 5 is a plan section on the line 5—5 of FIGURE 4.

FIGURE 6 is a fragmentary rear elevation of the metallic particle feed tube of FIGURES 4 and 5.

FIGURE 7 is a fragmentary rear elevation, partly in section, showing a variation in the metallic particle feed tube of the previous figures.

FIGURE 8 is a view similar to FIGURE 7 showing a further variation.

FIGURE 9 is a transverse vertical section through the work, the layer of metallic particles and the flux, just ahead of the arc and showing the consumable metallic electrode in the background.

FIGURE 10 is a view illustrative of my invention, showing a welding pass being made in a place between two previously laid weld beads and overlapping part of each, the particular view being a transverse vertical section through the work, the previously laid beads, the layer of metal particles and the flux, just ahead of the arc and showing the consumable metallic electrode in the background.

Describing in illustration but not in limitation and referring to the drawings:

I have limited penetration of an arc into the work in overlaying, by extending a metallic strip along the work under the arc and arcing to said strip. This subject matter is embodied in my copending application, Serial No. 822,808, filed June 25, 1959, for Process and Apparatus for Welding by Fusing a Metal Strip.

I have produced powder metallurgy preforms which extend along the work and limit penetration into the work. This subject matter is embodied in my copending application Serial No. 7,213, filed February 8, 1960, for Process of Electric Arc Welding, Machine and Weld Insert.

There are certain limitations and restrictions in the procedure according to said prior inventions, which I am seeking to overcome by the present invention.

According to the present invention, I deposit on the work a layer or ribbon of metallic particles ahead of the arc, then preferably deposit flux, and arc to the strip of metallic particles from a consumable metallic electrode.

When reference is made herein to metallic particles, I intend to indicate that the particles will either be powder, in which case they will suitably be of a fineness through 10 mesh and may grade down to much finer sizes, some being as fine as through 150 mesh or even 325 mesh. In certain instances, however, it will be desirable to use even coarser particles, for example through 3 mesh. When I refer to mesh I mean Tyler standard mesh per linear inch.

Metallic particles also in some cases will be metallic fibers in which case they will be capable of passing longitudinally through the mesh sizes mentioned above, but will suitably be elongated, for example 5 times to 50 times the diameter.

When reference is made herein to metallic particles, I intend to indicate that they will include metals and in some cases metalloids. The metals, or metalloids, employed may for example be iron, nickel, chromium, molybdenum, silicon, vanadium, manganese, cobalt, aluminum, titanium, columbium, zirconium, copper and tungsten as well as alloys thereof such as chromium-nickel, ferrochrome, stainless steel, and the like.

Of course it will be understood that the metallic particles will vary depending upon the alloy composition which is to be achieved in the overlay.

In producing overlays of stainless steel, a suitable ingredient in the mixture of metallic particles will frequently be low carbon iron powder. In some cases where the alloying ingredients are being added largely or entirely by the consumable welding electrodes, the metallic particles may entirely be of iron powder, for example, low carbon iron, which will avoid carbon contamination of the stainless steel.

For example, if the base metal has a carbon content of 0.30%, the limit on carbon in the iron powder may suitably be 0.02% or 0.01%.

Common overlay compositions will be type 300 or type 400 stainless steel. In some cases alloys higher in chromium and nickel, such as Carpenter 20 (which contains 20% chromium, 29% nickel, 3% molybdenum and 3% copper, balance iron) may be used as an overlay composition.

By using metallic particles in a layer or ribbon laid ahead of the arc, with a layer thickness of at least ¼ inch, it is possible to cut down penetration of the arc, as measured by dilution from the base metal, to 25% or less, whereas otherwise it would be in the range of 45 to 60%. This use of metal particles to cut down penetration is very efficient.

The ribbon of metal particles is desirably put down in a relatively narrow layer which tapers down abruptly at the sides. Suitable guides tend to form the ribbon in this manner, and help maintain the ribbon in this form. A layer of blanketing flux is applied in the form of loose particles which spreads over the layer of metal particles and tends to hold it in and shape it with steep sides exceeding the angle of repose.

One of the great advantages of the invention is that the metal particle ingredients can simply be mixed or blended together to produce a desired alloy, and it is not necessary to form a solid metal strip which in a particular alloy might be impossible to obtain commercially. Furthermore, it is not necessary to stock a number of different special alloy compositions, since the metal particles can simply be mixed in any proportion desired to produce the required alloy.

The feeding of the metal particles on to the work is accomplished very easily by a suitable feed tube or channel which may be adjusted as desired, with the flow controlled by a valve.

While it is permissible if desired to agglomerate metal particles of different compositions into granules before use, suitably bonding the particles together as by 30° Baumé or by 47° Baumé sodium silicate, to the extent of about 15% on the weight of the metal particles, of the liquid sodium silicate, followed by heating to elevated temperatures of the order of 300 to 800° F., such agglomeration is in many cases not desirable, as the sodium silicate tends to further decrease the bulk density of the particles, and also the presence of the sodium silicate is likely to make starting of the arc more difficult by increasing electrical resistance, thus requiring the use of a starting block.

While I illustrate the overlaying of straight plates or the like, it will of course be evident that the invention is applicable to overlaying of cylinders and other similar surfaces, the work being suitably rotated if desired.

While I illustrate the use of single arcs, it will be evident that multiple arcs may be employed as desired.

Considering now the drawings in detail, I illustrate work 20, which may suitably be a mild steel plate or the like which will suitably have an analysis in accordance with AISI 1030.

As illustrated in FIGURE 1, the welding head (which is not shown) travels forward with respect to the work in the direction of the arrow 21.

Mounted on the welding head in the forward position is a feed tube 22 for metallic particles which deposits metallic particles 23 on the upper surface of the work in a ribbon or layer 24 which extends in a trailing direction toward the flux and the arc. Following the tube 22 is a flux feed tube 25 which in the form of FIGURE 1 deposits submerged arc flux 26 on the layer of metallic particles 24.

Following the flux feed tube 25 is a contact guide 27 which guides a suitable continuous consumable metallic electrode 28 to a submerged arc 30, the arc being maintained between the consumable electrode and the upper surface of the layer 24 of metallic particles. The electrode is fed by any suitable drive, not shown.

In some cases it is preferable to employ an exposed arc rather than a submerged arc, and in FIGURE 2 I illustrate the lower part of the welding head which is moving forward along the work carrying first a feed tube 22' for metallic particles, then a flux feed tube 25, then a tube 31 for introducing a protecting gas, suitably carbon dioxide, helium or argon, and lastly the consumable electrode which maintains an exposed arc 30' with the top of the layer 24 of metallic particles, forming an overlay bead 32. The arc is here visible. The flux may come from a flux-cored electrode.

In the form of FIGURES 2 and 3, the lower end of the feed tube 22' is designed with a trailing slot or notch 33 between downwardly extending sides 34 of the tube.

It will be evident that the effect of the restraining sides 34 is to prevent the layer of metallic particles from spreading out in conformity with the angle of repose and the application of the loose flux particles which immediately follows tends to blanket and hold the metallic particles in a relatively high narrow steep-sided cross-section. This is illustrated particularly in FIGURE 9 where it is evident that the layer of metallic particles 24 has a considerable height at 36 and is relatively narrow with steep sides 37, and the presence of the loose flux particles 26 in a heap around it holds the shape of the cross-section when otherwise the metallic particles would flatten out as a thin strip. FIGURE 9 actually shows a submerged arc arrangement but it will be evident that whether the arc is submerged or exposed, the arcing will be accomplished to the top of the metallic particle layer 24.

In order to further assist in assuring that the metallic particles cannot spread, I show a variation in FIGURES 4, 5 and 6 in which the metallic particle feed tube $22^2$ has, at the trailing sides rearward of the slot 33, parallel side strips 38 which serve to confine the lateral movement of the metallic particles and further assist in permitting the blanket flux to engage the sides of the high pile of metallic particles before they can spread out into a relatively wide layer.

In some cases it is preferable to have the feed tube $22^3$ as shown in FIGURE 7 provided with sloping edges 40 on the slot 33' so as to provide for somewhat wider spread at the base of the strip of metallic particles, although even in this case the angle of the sides will suitably be steeper than the angle of repose. In this case the guide tube rides close along the work while in the form of FIGURES 2 and 3 and the form of FIGURES 4 to 6 the guide tube is slightly raised above the work so as to prevent chatter.

In some cases where the work is clad with previous overlay beads, as shown in FIGURE 8, the guide tube $22^4$ for the metallic particles has a short extension 34' at one side that is intended to ride on the previous welding bead 32 and a long extension $34^2$ at the other side that is intended to ride close to the plate 20. In this case also there are tapering sides 40 to permit some spread of the strip of metallic particles.

Under certain conditions, as for example especially where the inside of a curved vessel is being cladded, it is sometimes easier first to use metal strip as set forth in my previously mentioned copending U.S. application Serial No. 822,808 to lay down parallel beads spaced ⅛ inch to ½ inch apart, and preferably ¼ inch apart, and fill the space between them with the metal granules described in this present application, providing a layer of such metal granules to approximately the height of the beads on either side of the space. Then welding can proceed in this space using the same technique already described in this application to fully melt the granules, which in turn prevent dilution from the base metal, so as to leave a smooth surfaced weld. If desired, the same electrode, with the same heat and speed, can be used for this pass as was used previously to form the beads with the strip.

This process of laying down separated beads with a strip and then making a pass in between using the metal granules, can be repeated as needed to cover the surface as desired. That is, for example, once the two beads and intermediate bead have been completed, another bead utilizing a strip can be laid down separated from the nearest edge of what is already completed, and another bead utilizing metal granules can be laid down in between and so on. This process has the advantage of giving an unusually smooth surface.

An illustration of this method is given in FIGURE 10. On the concave face 50 of curved work 51 are laid down beads 53 and 54 parallel to each other ½ inch apart—that is, with ½ inch between their respective nearer edges—using the method described in my previously mentioned copending U.S. application, Serial No. 822,808, involving a strip. Granule layer 56 is laid down between beads 53 and 54 in a layer about even with their tops, cover flux 58 is deposited over granule layer 56 and beads 53 and 54, and submerged arc welding is accomplished by means of electrode 59 extending down into the cover flux 58.

It is also possible to lay down separated beads similar to beads 53 and 54 by a suitable method according to the present invention with its use of metal granules, such as the way shown in FIGURE 7 of the present application, and then continue as already described in order to make an intermediate pass, thus getting an unusually smooth surface.

The electrical conditions will vary, but for best results currents 500 to 900 amperes A.C. or D.C. will be used for a single arc, preferably about 600 to 800 amperes, with voltages of 35 and 45 volts, preferably 38 to 40 volts, and speeds of progression of the arc with respect to the work of 10 to 20 inches per minute. Electrode sizes of ⅛ inch to ¼ inch are suitable, and ribbons of metallic particles formed to at least ¼ inch, and preferably ½ inch, wide at the top may be used. The thickness of the layer of metallic particles will preferably be in the range of ½ to ¾ inch but may be as great as 1 inch. The source of electric current may be direct current, straight or reversed polarity, or alternating current.

The electrode composition will of course depend on the character of the overlay, but for stainless steel overlays the electrode composition will commonly be type 308 or type 316 stainless steel. The same applies to deep groove welding. Where the alloy is being supplied entirely by the metallic particles, the electrode may be mild steel.

*Example 1*

A one layer overlay was run on ¾ inch thick AISI 1030 steel plate using a 5/32 inch type 308 stainless steel electrode.

The metallic particles were a mixture of metal powders through 10 mesh having the following composition by weight:

| | Percent |
|---|---|
| Ferrochrome (65% chromium, low carbon grade) | 40 |
| Iron powder (low carbon grade) | 24 |
| Nickel powder | 20 |
| Ferro molybdenum powder (59% molybdenum) | 16 |

The mixture of metallic particles was fed through a tube with an outlet shaped as in FIGURE 7 and FIGURE 8, held 0.03 inch above the surface of the work, and it deposited a ribbon of granules about ½ inch wide and ¼ inch thick, weighing 80 grams per foot.

Three beads were put down side by side, the three together having a width totalling about 2⅝ inches wide and 18 inches long. The three beads covered a total area of the work of 47 square inches. The metallic particles consumed in making these three beads weighed 360 grams.

The 5/32 inch type 308 stainless steel electrode used to make these three beads weighed 1.31 pounds. The fused flux which melted weighed 1.37 pounds, and had a composition as follows.

Original dry powder:

| | Percent |
|---|---|
| Fluorspar | 8 |
| Limestone | 10 |
| Bentonite | 2 |
| Wollastonite | 79 |
| Aluminum powder | 1 |

Sodium silicate (1 to 2.9 ratio of $Na_2O$ to $SiO_2$) was used, 30 parts liquid to 100 parts of the above dry powder, and the flux was baked at 850° F. for 4 hours.

The weight of the weld metal deposited was 2.06 pounds.

The travel speed was 10 inches per minute. The current used was 500 amperes A.C., 35 to 38 volts. The layer of metallic particles was completely fused in one pass.

The overlay thickness was ¼ inch.

The dilution of the base metal in the overlay was 30%.

The chemical analysis of the filler wire was as follows:

| | Percent |
|---|---|
| Carbon | 0.041 |
| Manganese | 1.67 |
| Silicon | 0.29 |
| Sulphur | 0.013 |
| Phosphorus | 0.023 |
| Chromium | 20.13 |
| Nickel | 9.94 |
| Molybdenum | 0.17 |

The composition of the weld deposit taken at three different locations was as follows:

| Ingredient | Sample 1 | Sample 2 | Sample 3 |
|---|---|---|---|
| Carbon | not determined | 0.093 | not determined. |
| Manganese | 0.44 | 0.43 | 0.46. |
| Silicon | not determined | 0.72 | not determined. |
| Chromium | 17.11 | 17.43 | 17.32. |
| Nickel | 10.43 | 10.53 | 9.97. |
| Molybdenum | 2.19 | 2.21 | 1.89. |

Sample 1 was taken 4 inches from the starting end.
Sample 2 was taken at the center.
Sample 3 was taken 4 inches from the end of welding.

*Example 2*

The above was repeated with all other conditions the same, using a welding current of 650 amperes, with a voltage of 40 to 45 volts. The results were similar.

*Example 3*

The procedure of Example 1 was followed except that the metallic powder consisted of a mixture of the following composition by weight.

| | Percent |
|---|---|
| Ferrochrome (65% chromium, low carbon grade) | 43 |
| Nickel powder | 15 |
| Iron powder | 42 |

The current was 500 amperes alternating current, 35 to 40 volts, with 10 inches per minute travel speed. A 5/32 inch type 308 stainless steel wire was used as the electrode. A good single layer overlay was obtained with a chromium content of 17.5 to 20% and a nickel content of 10.06%.

*Example 4*

The procedure of Example 3 was followed making a 4-pass overlay with similar results.

*Example 5*

The procedure of Example 4 was followed and then a second overlay layer was placed on top. The chromium content of the second or top layer was 20.5 to 23.5% and the nickel content was 11.31%.

*Example 6*

The procedure of Example 1 was followed using a layer of metal particles having the following composition: Ferrochrome (65% chromium, low carbon), 100%.

Using only a 5/32 inch mild steel wire as an electrode to deposit a one layer overlay on a mild steel plate at 600 amperes alternating current, 35–36 volts, at 10 inches per minute travel speed, the composition of the resulting weld was:

| | Percent |
|---|---|
| Carbon | 0.089 |
| Silicon | 0.58 |
| Chromium | 17.31 |

Balance essentially iron.

*Example 7*

The procedure of Example 1 was carried out using a layer of metallic particles as follows: Iron powder (low carbon grade), 100%.

The results using a 5/32 inch type 308 stainless steel electrode, were as follows:

| | Percent |
|---|---|
| Carbon | 0.061 |
| Chromium | 11.10 |
| Nickel | 6.11 |

Balance essentially iron.

When using a 5/32 inch type 308 stainless steel electrode at 500 amperes, 32 volts with single A.C. arc travelling 15 inches per minute on a steel plate (without a barrier metal) having an analysis of AISI 1015, the penetration was 6 mm. Using a type 304 stainless steel strip on the plate ahead of the arc in accordance with my application Serial No. 822,808, 3/4 inch wide and 0.078 inch thick, this same arc penetrated to only 1.5 mm. Using a layer of metallic particles having the composition of Example No. 1 laid as a ribbon 1/4 inch high and 1/2 inch wide, arcing to this layer, the same arc penetrated 3 mm.

While, in the examples given, which involved a submerged arc process, a particular submerged arc cover flux having a particular composition was mentioned, the particular type of cover flux used is not vital. Any flux that is suitable for submerged arc welding, including any of the commercial fluxes now successfully on the market for that purpose, would do as a cover flux.

For some uses, it will be preferable, instead of using a single ribbon of metal particles which is of the order of 3/4 inch wide and 3/8 inch high at the top, to use a wider strip, with double arcs, for example a ribbon 1 1/4 inches wide and 3/8 inch high. This will make a single pass, one layer overlay, which is of the order of 2 inches wide and 5/16 inch thick. Following well-known techniques both welding electrodes will suitably to oscillated.

In view of my invention and disclosure variations and modifications to meet individual whim or particular need will doubtless become evident to others skilled in the art, to obtain all or part of the benefits of my invention without copying the process and apparatus shown, and I, therefore, claim all such insofar as they fall within the reasonable spirit and scope of my claim.

Having thus described my invention what I claim as new and desire to secure by Letters Patent is:

1. The process of electric arc welding, which comprises laying down on the work a layer of metallic particles having a thickness of at least one-quarter inch, restraining the sides of the layer of metallic particles as it is laid down to build up the layer to form a relatively steep sided narrow layer, depositing a layer of flux on the layer of metallic particles, maintaining an electric arc between a consumable metallic electrode and the layer of metallic particles at a position where the flux is located, and relatively moving the arc and the layer of metallic particles, while maintaining the arcing to the layer of metallic particles.

2. The process of electric arc welding, which comprises depositing a layer of metallic particles on the work to a thickness in excess of one-quarter inch, the layer being steeper in cross section than the angle of repose of the metallic particles, laying down on the layer of metallic particles a layer of flux particles and by the flux particles holding the layer of metallic particles in a cross section which has steeper sides than the angle of repose would permit, arcing between a consumable metallic electrode and the layer of metallic particles at a location where the flux is present, and relatively progressing the arc and the layer of metallic particles at a location where the flux is present while maintaining the arc to the layer of metallic particles and maintaining the electrical input at a rate which completely melts the layer of metallic particles.

3. The process of electric arc welding, which comprises depositing a layer of metallic particles on the work to a thickness in excess of one-quarter inch and in a cross section which is steeper than the angle of repose of the metallic particles, covering the layer of metallic particles with a layer of flux particles which holds the cross section at an angle steeper than the angle of repose of the metallic particles, establishing and maintaining an arc submerged beneath the flux, between a consumable metallic electrode and the layer of metallic particles and relatively moving the arc and the layer of metallic particles while maintaining the arc between the electrode and the layer of metallic particles.

4. The process of electric arc welding, which comprises depositing a layer of metallic particles to a thickness in excess of one-quarter inch on the work, depositing flux on the layer of metallic particles, establishing and maintaining an exposed electric arc to the layer of metallic particles from a consumable metallic electrode, protecting the arc by a protective atmosphere and progressing the arc with respect to the layer of metallic particles while continuing to arc to the layer of metallic particles and substantially completely fusing the layer of metallic particles in the arc as the arc progresses.

5. The process of electric arc welding, which comprises depositing a layer of metallic particles on the work with a cross section steeper than the angle of repose, depositing on the layer of metallic particles flux particles which maintain the layer of metallic particles at a cross section steeper than the angle of repose, the layer of metallic particles having a thickness greater than one-quarter inch, establishing and maintaining an exposed electric arc between a consumable metallic electrode and the layer of metallic particles and relatively progressing the exposed arc and the layer of metallic particles while maintaining the arc to the layer of metallic particles and substantially completely fusing the layer of metallic particles in the arc.

6. In an electric arc welding apparatus, nozzle means for guiding a mass of metallic particles to the work, said nozzle means having extending sides and a recess in the trailing direction, means for feeding flux to the work behind the nozzle for the metallic particles, electric arc means and means for progressing the apparatus including the nozzle for the metallic particles, the means for feeding the flux and the electric arc means together.

7. Apparatus of claim 6, in combination with guides extending from the nozzle means in the trailing direction on either side of the discharge for the nozzle for preventing spread of the metallic particles.

8. Apparatus of claim 7, in which the opening of the nozzle means in the trailing direction tapers progressively downward at the sides.

9. Apparatus of claim 8, in which the nozzle for the particles has one elongated side and one shorter side adapted to rest on a previous weld bead.

10. The process of electric arc welding, which comprises depositing a layer of metallic particles to a thickness in excess of one-quarter inch on the work, establishing and maintaining an exposed electric arc to the layer of metallic particles from a consumable metallic electrode, protecting the arc by a protective atmosphere and progressing the arc with respect to the layer of metallic particles while continuing to arc to the layer of metallic particles and substantially completely fusing the layer of metallic particles in the arc as the arc progresses.

References Cited in the file of this patent

UNITED STATES PATENTS

| | | |
|---|---|---|
| 2,330,289 | Keir | Sept. 28, 1943 |
| 2,927,940 | Johnson | Mar. 8, 1960 |